United States Patent [19]
Pritchard et al.

[11] Patent Number: 4,558,347
[45] Date of Patent: Dec. 10, 1985

[54] PROGRESSIVE SCAN TELEVISION SYSTEM EMPLOYING VERTICAL DETAIL ENHANCEMENT

[75] Inventors: Dalton H. Pritchard; Walter E. Sepp, both of Princeton, N.J.

[73] Assignee: RCA Corporation, Princeton, N.J.

[21] Appl. No.: 526,702

[22] Filed: Aug. 26, 1983

[51] Int. Cl.[4] .............................................. H04N 5/02
[52] U.S. Cl. .................................... 358/11; 358/140; 358/37; 358/166
[58] Field of Search ..................... 358/11–16, 358/21 R, 64, 135, 140, 153, 166, 217, 242, 160, 36, 37

[56] References Cited

U.S. PATENT DOCUMENTS

| | | | |
|---|---|---|---|
| 4,096,516 | 6/1978 | Pritchard | 358/31 |
| 4,245,237 | 1/1981 | Lagoni | 358/31 |
| 4,400,719 | 8/1983 | Powers | 358/21 R |
| 4,415,931 | 11/1983 | Dischert | 358/242 |
| 4,429,327 | 1/1984 | Oakley et al. | 358/12 |

FOREIGN PATENT DOCUMENTS 2110900 6/1983 United Kingdom .
2111343 6/1983 United Kingdom .

Primary Examiner—Michael A. Masinick
Attorney, Agent, or Firm—P. J. Rasmussen; P. M. Emanuel; R. G. Coalter

[57] ABSTRACT

A flat-field television image having reduced visibility of horizontal scan lines is generated by receiving first and second fields of interlaced video and progressively generating a scanned image within a time for one incoming field. The progressive scanned image is formed from "real" and interpolated lines of luminance. In this arrangement the interpolated line is formed by weighting samples from time-successive lines. To improve the vertical detail of a progressively scanned image vertical detail information which may be obtained from the chrominance channel is combined with both "real" and interpolated lines, or one to the exclusion of the other, to enhance the image displayed.

37 Claims, 6 Drawing Figures

PROGRESSIVE SCAN TELEVISION SYSTEM EMPLOYING VERTICAL DETAIL ENHANCEMENT

This invention relates to television systems and, more particularly, to television display apparatus, such as a television receiver, which displays a progressive scan format providing reduced artifacts of interline flicker and line break-up with motion and having improved vertical detail.

BACKGROUND OF THE INVENTION

Broadcast systems throughout the world create visible artifacts on standard, present day, television receivers and monitors. In broadcast systems such as the 525 line-per-frame, 30 frame-per-second (525/30) NTSC system or the 625/25 PAL system, artifacts are derived from the line-scanning process. These artifacts arise mainly due to the interlaced process as set forth in the standards and as are visible in interlaced display techniques. This process divides the 525-line picture or frame into two successive 262½-line fields. The 262½ lines of one field are scanned in 1/60th of a second followed by scanning of an additional 262½ lines of another field with the second field lines occupying the spaces between the lines of the first field. One subjective effect of this interlaced scan is to create an apparent vertical drift of the lines of the raster as a function of vertical motion. The apparent drift is more easily seen when viewing a wide-screen display at close range. Another visible effect is interline flicker in transitions in the vertical direction that occur within one line time to the next.

Recent interests in the development of high definition television systems (HDTV) has been directed to techniques intended to enhance the subjective performance of present systems within the constraints of existing standards. One approach, a technique referred to as progressive scan, or sequential scan, has been described in patent materials and literature. The incoming signal in a conventional two-to-one vertical interlaced format is stored in an appropriate memory and subsequently displayed in a non-interlaced or progressive line-scan manner. For example, in copending U.S. patent application Ser. No. 526,700 entitled, "Progressive Scan Television Display System Employing Interpolation in the Luminance Channel" filed concurrently herewith in the name of D. H. Pritchard, progressive scan is accomplished by employing line memories with multiple-point interpolation. According to the Pritchard application, in the case of NTSC, 525 lines of the display are displayed in 1/60th of a second wherein alternate "real" and "interpolated" lines are successively displayed at some multiple (generally, two-times) standard horizontal rate. During the next 1/60th of a second a successive set of 525 lines are displayed to complete a total frame time in 1/30th of a second, however, these 525 lines are related to the first 525 lines such that alternate "interpolated" and "real" lines are displayed. In one preferred embodiment of Pritchard a simple two-point (using a 1/H delay) linear interpolator is used to form the interpolated line. Progressive scan results in the elimination of artifacts of "interline flicker" and "line break-up with motion" that exists in conventional two-to-one interlaced displays. The subjective effect is a flicker-free, "smooth" or "quiet", picture presentation that is more pleasing to the viewer.

Advantageously, in accordance with the Pritchard system a simple two-point linear interpolator may be used to effect progressive scanning. Such a system, however, results in some loss of vertical detail on transitions that occur from one line to the next, i.e., at the vertical sampling Nyquist rate. To restore vertical detail some HDTV systems utilize multiple point (i.e., more than two) interpolation processes which require two or more 1-H delay memory elements with appropriate weighting factors in the summation process to provide improved performance by producing a "better" approximation in the interpolated line. The problem with such a scheme is that the vertical detail restoration requires additional lines of memory. For an illustration of a progressive scan system using multiple point interpolation reference may be made to U.S. Pat. No. 4,400,719 in the name of K. H. Powers.

SUMMARY OF THE INVENTION

In accordance with the present invention a progressive scan television system is provided having improved performance while requiring only one line of memory in a linear interpolator. This is accomplished by the judicious use of vertical detail information.

In accordance with one aspect of the present invention a color television system for producing a progressively scanned image comprises a source of television signals representing luminance and chrominance of an image raster-scanned in an interlaced fashion. Luminance time-compression means, coupled to the source of television signals, divides the duration of each line of the luminance-representative signal by a first predetermined factor forming a speeded-up luminance-representative signal. Chrominance time-compression means, coupled to the source of television signals, reduces the time duration of each line of the chrominance-representative signal by a second predetermined factor forming a speeded-up chrominance-representative signal. Coupled to receive the television signals is an interpolating means generating lines of signals representative of an estimate of signals which would represent the image between time-successive lines of the signals of the source of television signals and for separating the television signals into luminance-representative and chrominance-representative signals. Further the system includes display means coupled to the luminance and chrominance time-compression means and to the interpolating means for displaying, by progressive scanning, lines of video derived from the chrominance time-compression means and from the luminance time-compression means. In accordance with a further aspect of the invention the interpolating means generates an estimate of a signal from two samples of the time-successive lines of the signals to form the progressive image. When such an interpolation process is carried out the image suffers a loss of vertical detail on signal transitions that occur on adjacent lines of the television signals. Thus, the system further includes detail means for recovering spectral components representative of the vertical detail in the luminance information from a signal including vertical detail information and combines these spectral components with the luminance-representative signal to improve vertical detail on the signal transitions.

DETAILED DESCRIPTION OF THE PREFERRED EMBODIMENTS

Figure 1:
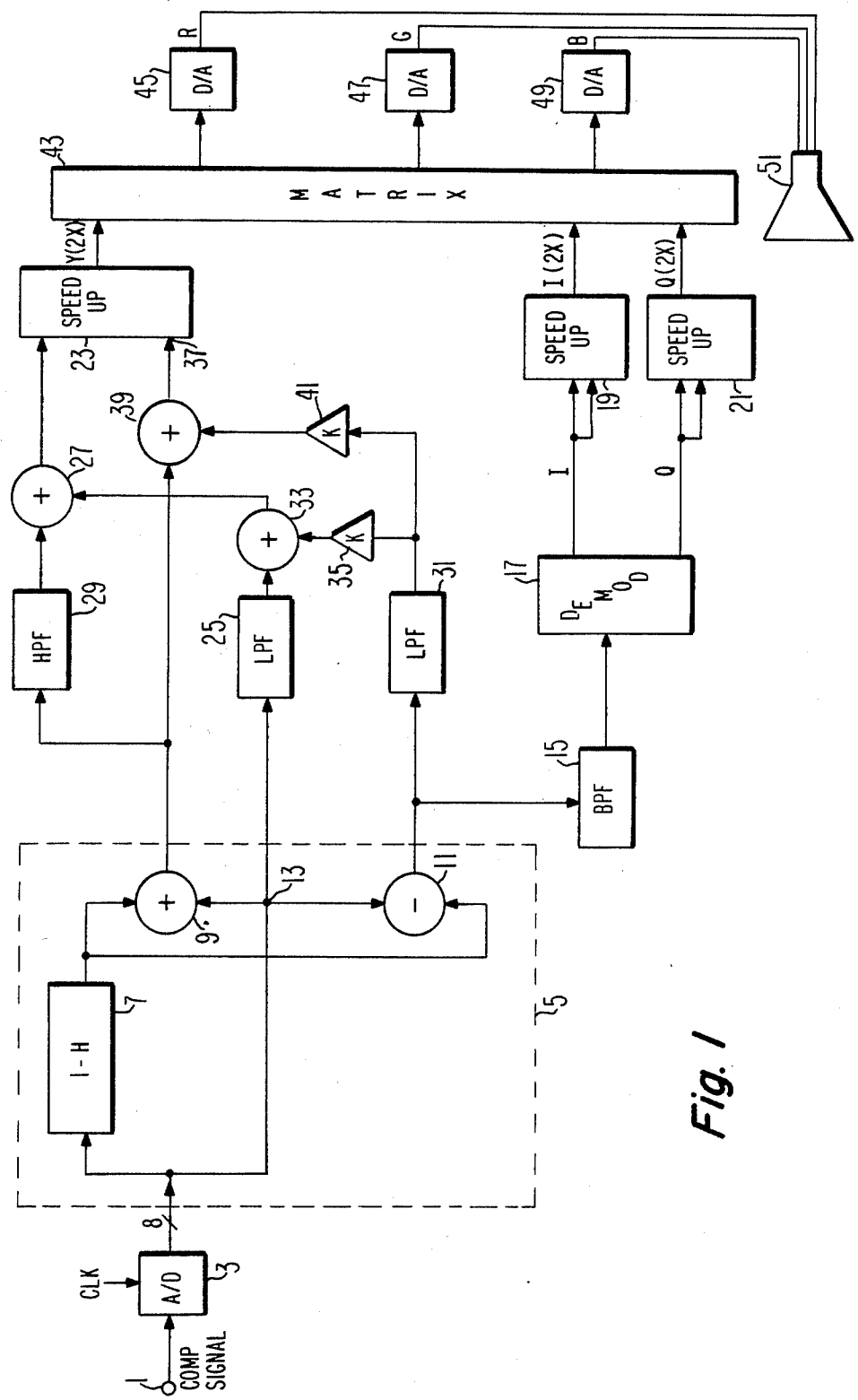
FIG. 1 is a block diagram of a first embodiment of a progressive scan television receiver arranged in accordance with the principles of the present invention.

Referring to FIG. 1, an analog, composite, interlaced-scan color television signal is applied to terminal 1 from a source (not shown). The source of the analog signal may be the demodulated output of the intermediate-frequency (IF) stage of a standard television receiver. It should be noted that the present invention will be described with reference to an NTSC composite, interlaced, color television signal, however, it should be obvious to one of skill in the art that other composite, or component, interlaced color television systems, such as PAL, fall within the scope of the invention described herein. The composite signal is applied to an analog-to-digital converter (ADC) 3 where it is converted to digital form under the control of a clock signal which, illustratively, may be at four-times the color subcarrier (4 sc, e.g., 4×3.58 MHz). The digital signal from ADC 3 is a sequence of 8-bit numbers representative of the analog values of the composite signal. The digitized composite signal is applied to separator 5 which, illustratively, may be a two-terminal transversal filter having a 1-H delay 7, also known as a comb filter, (1-H delay is equal to the time required to scan a horizontal line in an NTSC signal, e.g., 63.5 μs). In separator 5 the 1-H delayed signal is combined in adder 9 with an undelayed signal to form a signal which is combed. The luminance-representative component of the composite signal having a frequency spectrum with signal energy concentrated in the vicinity of integer multiples of the line rate, (i.e., 15,734 Hz) and nulls of signal energy in the vicinity of odd integer multiples of one-half of the line rate is provided at adder 9 output. Similarly, delayed and undelayed lines are applied to subtractor 11 which provides a second combed signal representing a portion of the luminance information and the chrominance information having a frequency spectrum with signal energy concentrated in the vicinity of odd integer multiples of one-half of the line rate (i.e., 15,734 Hz) and nulls of signal energy in the vicinity of integer multiples of the line rate. Further, separator 5 provides an unmodified and undelayed signal at node 13. In accordance with the embodiment of FIG. 1 the chrominance signal from subtractor 11 is bandpass filtered in bandpass filter 15 to provide the combed modulated chrominance information to demodulator 17. Bandpass filter 15 and all other filters described herein may be implemented by digital techniques. In this arrangement the chrominance information is not interpolated as suggested in the previously mentioned Pritchard application. It should be understood, however, that the chrominance information could be interpolated. Demodulator 17 provides the demodulated I and Q signals to speed-up processors 19 and 21, respectively. The speed-up processors 19 and 21 produce time-compressed I and Q signals compressed at a multiple (e.g., two-times) of the input rate. Speed-up processors 19 and 21 may be implemented by the technique described in the aforementioned Pritchard application. The twice rate I and Q signals are provided to matrix 43.

The output in the luminance channel from two-times speed-up block 23 consists of two signals which alternate. The first signal, which will be designated the "real" signal, has had a chrominance removed. The second signal is a two-point linear interpolated signal. Both of these signals, the "real" line from adder 27 and the interpolated line from terminal 37, are fed to two-times speed-up block 23 to produce alternating real and interpolated signals at twice the input rate. Illustratively, speed-up block 23 may be implemented as described in U.S. patent application Ser. No. 526,701 filed concurrently herewith in the name of W. E. Sepp. The double-rate operation during read-out increases the bandwidth of the signal by a factor of two and also shortens the duration of the horizontal line by a factor of two (31.75 μs instead of 63.5 μs). In general, speed-up block 23 may include four delay lines, each being one horizontal line in length, which are clocked-in at the four-times the color subcarrier rate (4 sc) and readout by a commutation process at eight times the subcarrier rate (8 sc). Thus the output from speed-up block 23 is continuous video at two-times the horitontal line frequency producing twice rate Y signal to provide continuous luminance which alternates between "real" and interpolated signal information.

The "real" luminance line is formed by combining the non-combed low frequencies of the undelayed luminance signal with a complementary high-pass filtered, combed luminance signal which is derived from the comb filter summation process. That is, the undelayed signal from node 13 is low pass filtered in low pass filter 25 (illustratively, having a passband up to about 1.5 MHz) and applied to adder 27 via adder 33. The combed luminance information from adder 9 is high pass filtered in high-pass filter 29, illustratively having a pass band 1.5 to 4 MHz. The high pass filtered, combed luminance signal is combined with the low pass filtered uncombed luminance signal in adder 27 to form the "real" luminance signal which is applied to speed-up processor 23. Vertical detail information is obtained by low pass filtering the combed chrominance signal in low pass filter 31 and is then combined in adder 33 to the low-pass information from low pass filter 25 in the "real" signal path to provide a subjective enhancement (improvement) of the visual sharpness of vertical transitions.

Figure 2:
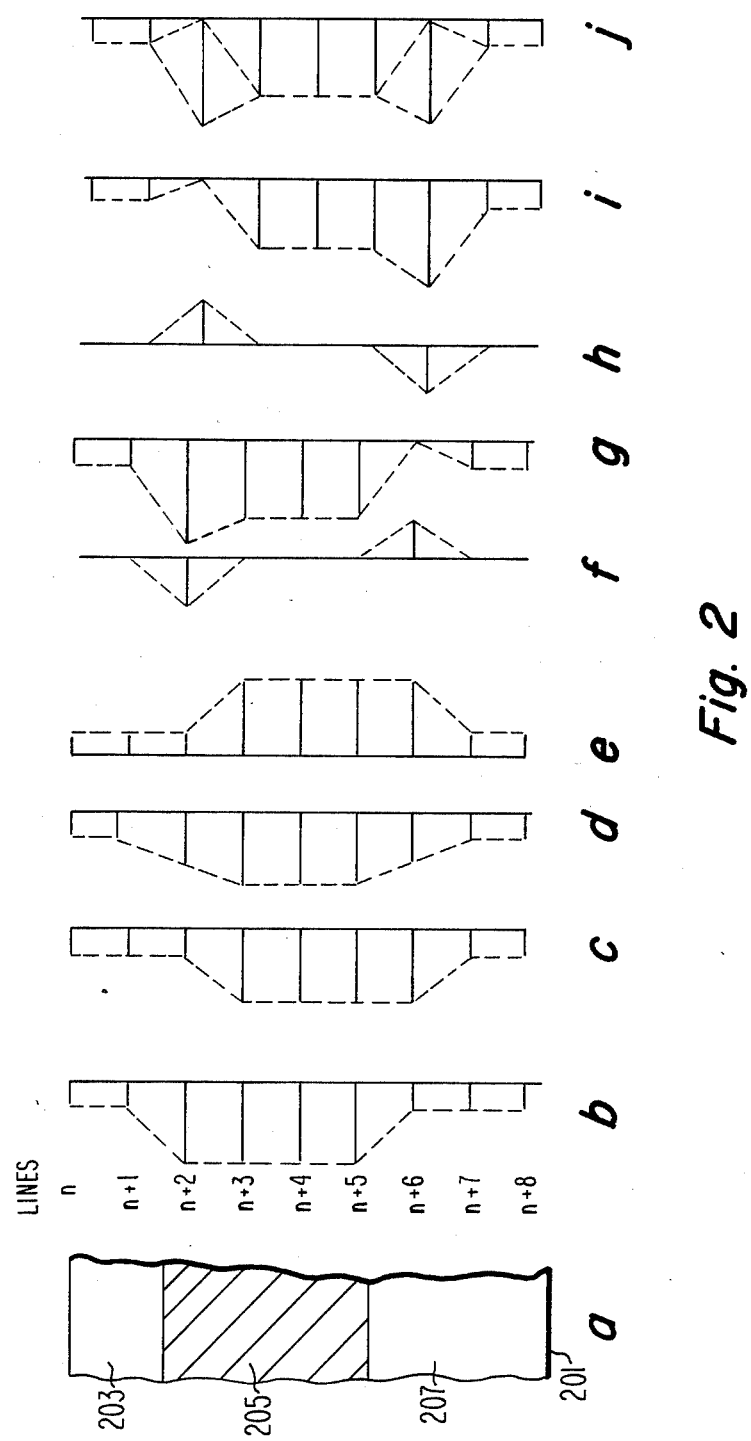
FIG. 2 shows a portion of a television display and vertical signal transition for use in explaining the details of the invention.

Referring to FIG. 2 a description on a line-by-line basis is provided for vertical signal transitions demonstrating the vertical detail enhancement. FIG. 2a shows a portion of a television raster 201 showing some vertical transitions. At the top is a gray area 203, in the middle a white area 205 and at the bottom a gray area 207. FIGS. 2b through 2j show the line-by-line vertical signal transition and enhancement provided in accordance with FIG. 1. In FIG. 2b the transition occurs between lines n+1 and n+2 from gray to white and from white to gray between lines n+5 and n+6. FIG. 2c shows the same transition delayed one line which is the effect of the delayed line going through 1H delay 7. The two signals, FIGS. 2b and 2c, are combined in adder 9 to form the combined signal of FIG. 2d (i.e., interpolated signal). By inspection of FIG. 2d it can be seen that there has been some loss of vertical detail in the summation (interpolation) process, the signal transition which occurred between lines n+1 and n+2 in the original signal path now takes two time periods, i.e., between lines n+1 and n+3. Thus there is a softening of vertical transitions. FIG. 2e represents a delayed inverted signal. If delayed inverted signal of FIG. 2e is combined with the direct signal of FIG. 2b the result is the signal of FIG. 2f which has an output representative of the detail in the vertical transitions of the direct signal. When signal f (FIG. 2f) is combined with the direct signal (FIG. 2b) in a predetermined relative gain ratio, the signal of FIG. 2g is formed having vertical enhancement.

If signal f is reversed in polarity as shown by FIG. 2h, in a predetermined relative gain ratio, the interpolated signal of FIG. 2d the resultant signal is represented by FIG. 2i. FIG. 2i represents the interpolated signal having vertical enhancement. When FIGS. 2g and 2i are combined in a common FIGURE as shown by the plot of FIG. 2j the transitions of the signal are subjectively enhanced.

In accordance with the present invention the luminance signal is provided having vertical enhancement to reduce the softness of the edge effected by the interpolation process. In accordance with the principles of the present invention 525-line field of video is displayed during one field time period (odd field) where the horizontal lines alternate between "real" and "interpolated". In the next successive field (even field) the positions on a HDTV progressive scan display which were occupied by "real" lines of the previous field scan are occupied by "interpolated" lines and the positions occupied by "interpolated" lines in the odd field are occupied by "real" lines in the even field. Thus, the odd number of lines in a progressive scan sequence effects a shift of "real" and "interpolated" lines in successive fields.

As noted above, the gain, polarity and presence or absence of a vertical enhancement in a channel depends upon the subjective effect desired. For example, adding vertical enhancement, in a predetermined relative gain ratio in the "real" line path provides one form of vertical enhancement, adding vertical enhancement, again in a predetermined relative gain ratio, in the "interpolated" line path provides another form of vertical enhancement and providing vertical enhancement in both paths provides a third form of vertical enhancement.

It is generally felt that it is desirable to provide vertical enhancement that is symmetrical and of opposite polarity in the respective signal paths (see FIG. 2j). Although this arrangement may effect some residual flickering where transitions occur (lines n+2 and n+6 of FIG. 2j) the overall effect is subjectively pleasing.

According to FIG. 1 this vertical enhancement is provided by the combination of low pass filter 31 and adder 33. FIG. 1 includes a provision for introducing vertical enhancement at different rates (i.e., using a different weighting function). This is provided by the gain of amplifiers 35 and 41 whose gain and polarity may be chosen in accordance with the subjective effect that is desired. Another option would be to provide amplifiers 35 and 41 having a non-linear transfer function for the purpose of optimum trade-off between subjective enhancement and flicker. Illustratively, a characteristic shown in U.S. Pat. No. 4,245,237 issued on Jan. 13, 1981 in the name of W. A. Lagoni may be used.

In FIG. 1 the "real" line alternates with an interpolated line at a HDTV display. The interpolated line is provided at the output of the adder 9 of comb filter 5. One of the advantages of this arrangement is that the comb filter 5 provides in combination a separated luminance and chrominance signal and also a two-point interpolated signal. The interpolated signal is applied via terminal 37 to speed-up processor 23. It should be noted that the interpolated line is also provided having vertical enhancement by including adder 39 to add in vertical detail information into the interpolated path from low pass filter 31. Accordingly, depending upon the subjective effect desired, the polarity and gain of the vertical detail enhancement of the interpolated line can be modified by amplifier 41.

A special case of the FIG. 1 embodiment would be to provide only a 2-times rate repeat for the combed luminance without any interpolation, for example, in a system as described in U.S. Pat. No. 4,415,931 in the name of R. A. Dischert. In all arrangements, the equivalent temporal vertical filter has a null at the horizontal line rate such that line break-up with motion is eliminated. However, the vertical sharpness is the function of the amount of vertical detail re-inserted and is a subjective trade-off between sharpness and interline flicker.

Referring to FIG. 1 again, the separate double-rate Y, I and Q signals are matrixed in matrix circuit 43 which generates twice-rate red (R), green (G), and blue (B) signals. The R, G and B signals which are digitized are applied to digital-to-analog converters 45, 47 and 49, respectively, to produce R, G and B analog output signals. The R, G and B analog signals at the output of D-to-A's 45, 47 and 49, which are two-times the bandwidth of standard definition signals, are applied to a display unit 51 including a kinescope operated at, illustratively, a 31.75 KHz rate for scanning a total of 525 lines in a progressive scan manner.

Thus, the arrangement of FIG. 1 produces and displays 525 lines of progressively scanned or non-interlaced video for each 262½-line field of interlaced incoming video. Such an image more closely approximates the appearance of a flat-field display (a display not having subjectively visible scan lines).

The arrangement of FIG. 1 provides two-point interpolation and double-rate translation in the luminance channel with vertical detail enhancement plus double-rate translation (no interpolation) in the chrominance channel. The luminance signal alternates between an interpolated and doubled-in-speed line and a "real" doubled-in-speed line. The demodulated chrominance components are individually doubled-in-speed and matrixed with luminance at two-times to form the two-times rate R, G and B component signals to operate a display whose horizontal scan rate has been doubled (illustratively, increased from 15,734 Hz to 31,468 Hz).

Figure 3:
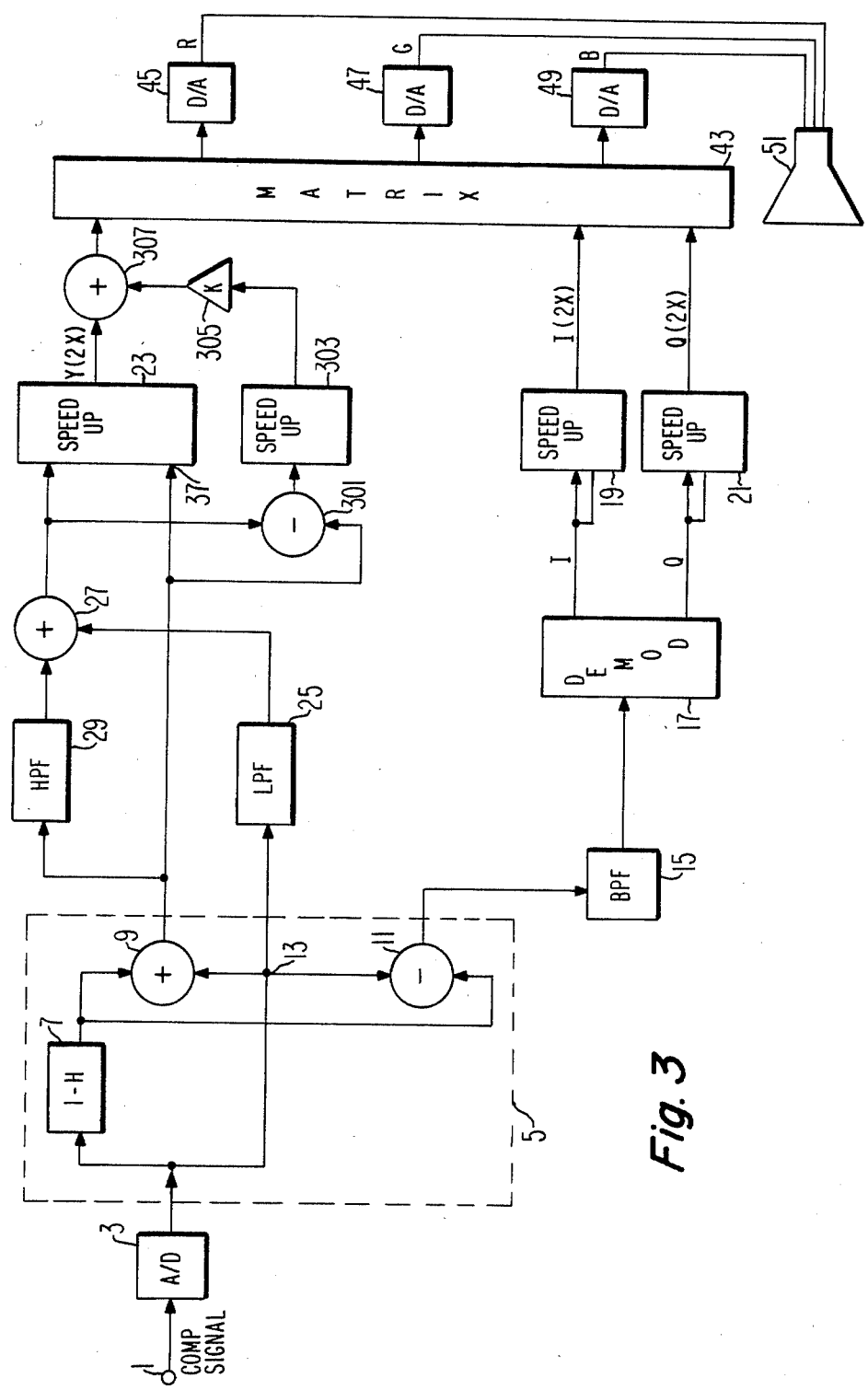
FIGS. 3, 4, 5, and 6 are block diagrams of additional embodiments of a progressive scan television receiver arranged in accordance with the principles of the present invention.

Referring to FIG. 3, another arrangement is shown for providing progressive scan having improved vertical detail. In accordance with this technique the vertical detail information is obtained by subtracting the interpolated line from the "real" line, thereby separating the interpolation process and the combing process if appropriate for overall system implementation and partitioning reasons. In the FIGURES, elements designated with like reference numerals are the same or similar items in the various FIGURES. A composite signal at terminal 1 is applied to A-to-D converter 3 which, in turn, is applied to separator 5 for separating the signal into a combed luminance signal from adder 9, an uncombed, undelayed signal at the output of terminal 13 and a combed chrominance signal including the low frequency vertical detail luminance information at the output of subtractor 11. In FIG. 3 the chrominance signal is handled as it was with respect to FIG. 1. It is bandpass filtered in bandpass filter 15, demodulated into the I and Q components in demodulator 17, and speeded-up in two-times speed-up blocks 19 and 21 to provide double-rate I and Q signals to matrix 43. The luminance signal is also handled in a manner similar to that described with respect to FIG. 1 in that the combed luminance signal is high pass filtered in high pass filter 29 and combined in adder 27 with the low pass filtered undelayed, uncombed luminance signal via low pass filter 25. This "real" signal is applied to two-times speed-up buffer 23. The interpolated output from separator 5 (via adder 9) is applied to terminal 37 of the two-times speed-up buffer 23 wherein it is doubled in rate. In accordance with the details of FIG. 3 the vertical detail information is derived by applying the output from adder 27, i.e., the "real" line, and the interpolated line (via adder 9) to subtractor 301. The vertical detail information is two-times speeded-up, to match the two-times speed-up operation in block 23, in speed-up block 303. The twice speed vertical detail information from speed-up block 303 may be applied to amplifier 305 to provide a choice of polarity and gain to the vertical detail information and then combined with the two-times luminance information in adder 307. The enhanced luminance information from adder 307 is applied to matrix 43 wherein the twice rate Y, I and Q signals are matrixed to form twice rate R, G and B signals formed into analog signals in D-to-A's 45, 47 and 49, respectively, and applied to display unit 51 for scanning in a progressive scan manner.

Figure 4:
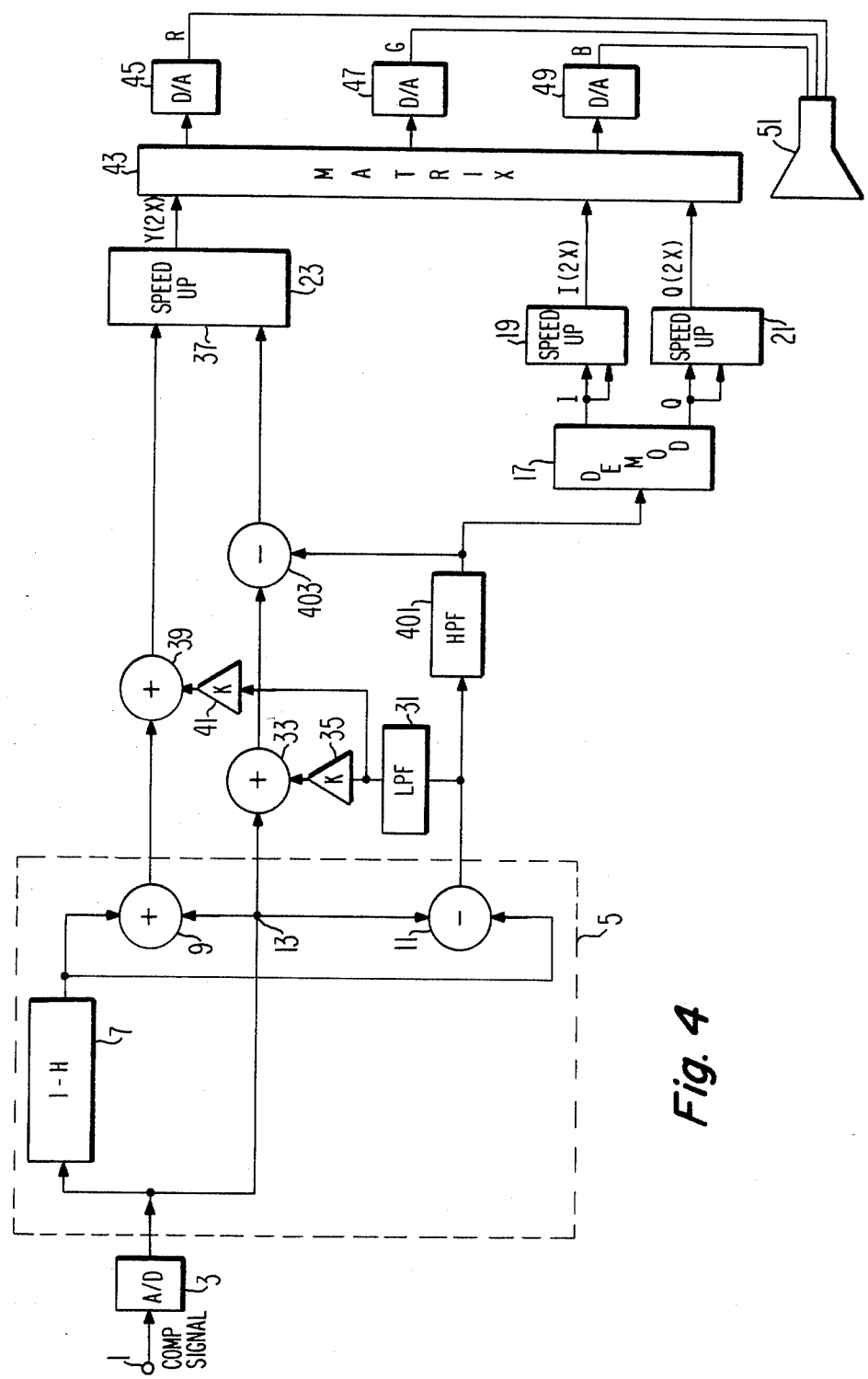

Referring to FIG. 4, another arrangement for the invention is disclosed. In the FIG. 4 arrangement only one set of complementary low-pass and high-pass filters are employed to provide vertical detail enhancement. A composite signal at terminal 1 is applied to analog-to-digital converter 3 which, in turn, is applied to separator 5 for forming at the outputs of adder 9, terminal 13 and subtractor 11 an interpolated luminance signal, a "real" luminance signal and a combed chrominance signal including low frequency vertical detail of the luminance signal, respectively. The output of subtractor 11 is applied to complementary filters including low pass filter 31 and high pass filter 401. The low pass filtered signal is applied via gain control devices 41 and 35 to respective adders 39 and 33 to provide vertical enhancement to the interpolated and "real" signals, respectively. Of course, it should be noted that adders 33 and 39 may both be included or only adder 33 or adder 39 may be included—the choice depends on the subjective effect desired. Furthermore, amplifiers 35 and 41 are provided having polarity and gain dependent upon the subjective effect to be provided. The interpolated output from adder 39 is applied to terminal 37 of speed-up processor 33 and the output from adder 33 is applied to subtractor 403. The subtractor 403 removes the high frequency interlaced chrominance information from the "real" luminance signal in comb filter fashion. The "real" luminance signal which is now absent the chrominance information is applied to speed-up processor 23. Speed-up processor 23 provides twice-rate luminance information which alternates between "real" and interpolated lines which is applied to matrix 43. The high pass filtered chrominance information from high pass filter 402 is applied to demodulator 17 where it is demodulated into its I and Q components. The I and Q components are applied to speed-up processors 19 and 21 to provide twice rate I and Q signals which are applied to matrix 43. The R, G and B outputs of matrix 43 are converted to analog form in D-to-A's 45, 47 and 49 forming analog R, G and B signals which are applied to kinescope 51 for display in the progressive scan format as described above.

Figure 5:
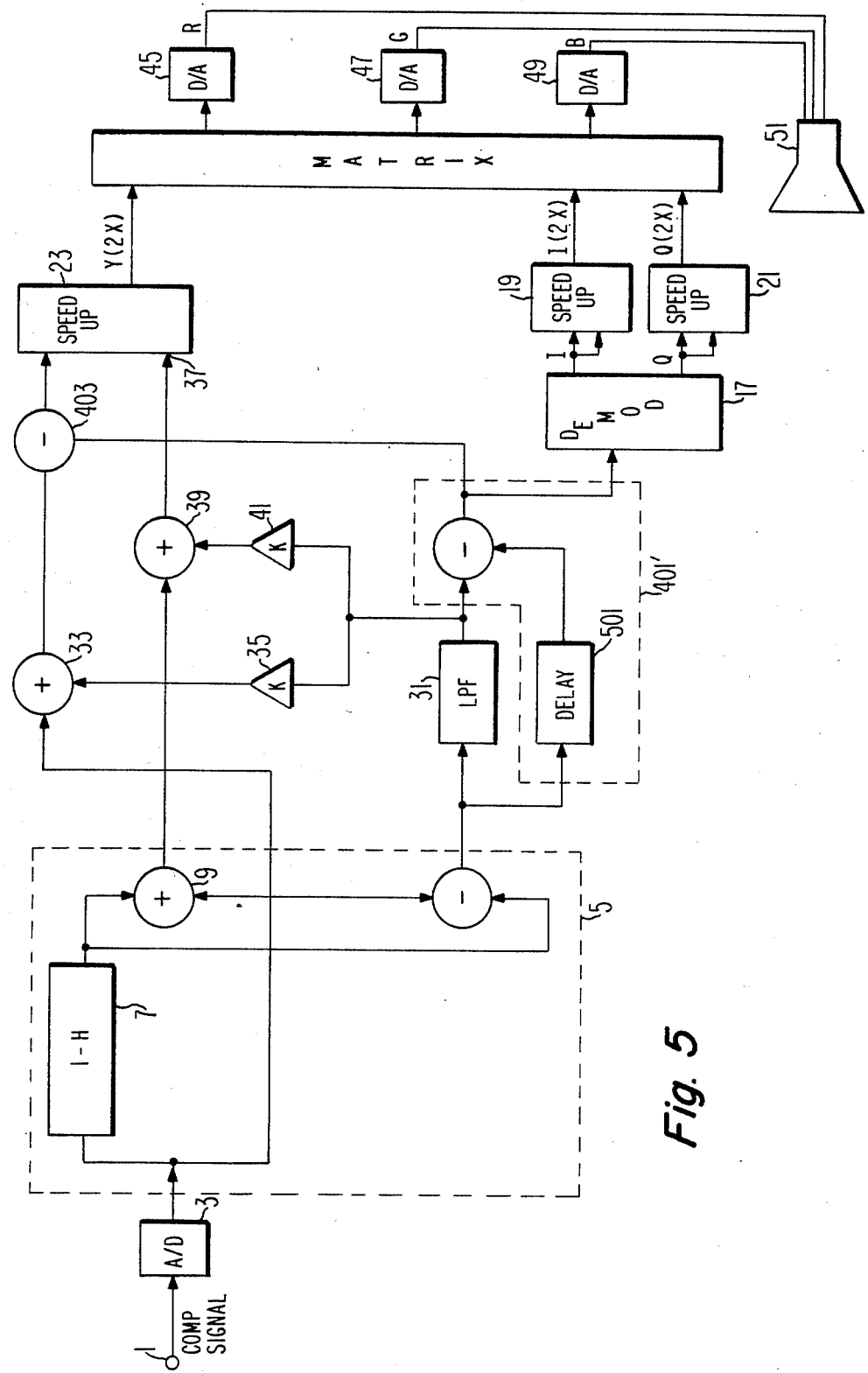

Another approach for providing the complementary low-pass and high-pass filtering arrangement of FIG. 4 is shown in FIG. 5. Referring to FIG. 5, high pass filter 401' is provided by delay element 501 and subtractor 503. Delay element 501 is provided having a delay equal to the delay through low pass filter 31 such that the output of subtractor 503 which includes the low frequency combed signal has the effect of high pass filtering the chrominance output from subtractor 11. The other details of the arrangement of FIG. 5 will not be discussed in detail since those details are provided with respect to the FIG. 4 arrangement.

Figure 6:
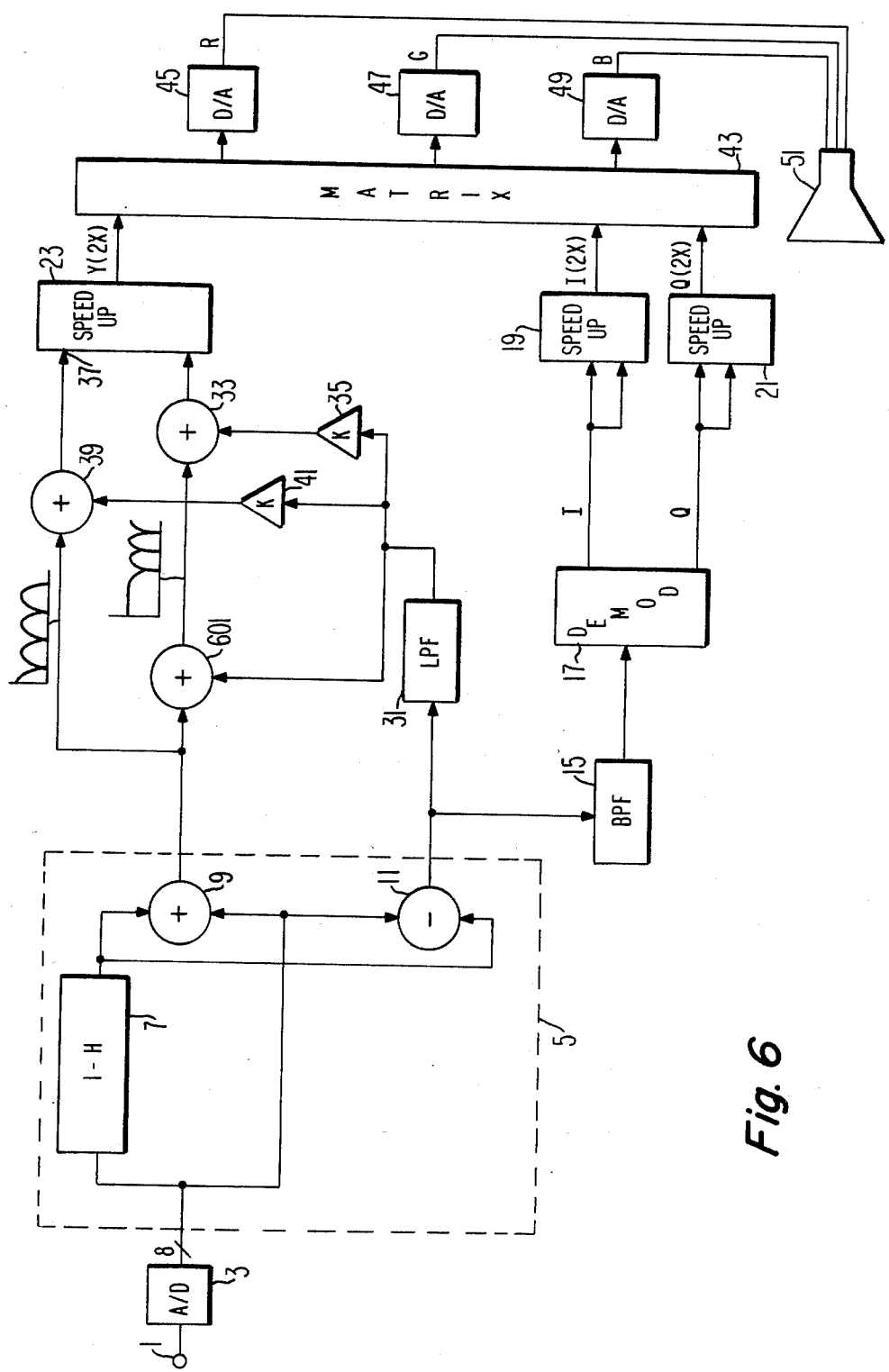

A desirable approach for providing progressive scan having vertical detail enhancement is shown in the arrangement of FIG. 6. In accordance with the arrangement of FIG. 6 the real line is formed by adding the low frequency detail information in the chrominance signal output from separator 5 to the combed luminance signal from the luminance signal channel of separator 5. A composite signal at terminal 1 is applied to A-to-D converter 3 which in turn is applied to separator 5 for separating the signal into a combed luminance signal from adder 9, a combed chrominance signal including the low frequency detail luminance information at the output of subtract 11. In FIG. 6 the chrominance signal is handled in the same manner as it was handled in the FIG. 1 case. It is bandpassed filtered in bandpass filter 15, demodulated into I and Q components in demodulator 17 and speeded-up in two-times speed-blocks 19 and 21 to provide double-rate I and Q signals to matrix 43. The combed luminance signal from adder 9 of separator 5 is simultaneously applied to adder 601 and adder 39. The output of subtractor 11 is applied to low pass filter 31 where the combed vertical detail information is recovered from the output of subtractor 11. The low pass filtered signal from filter 31 is summed in adder 601 with the combed luminance signal to provide the "real" signal. Thus the output of adder 601 is the luminance signal having a low frequency vertical detail information restored after the combing process of separator 5. Further the low pass filtered signal from low pass filter 31 is applied via gain control devices 35 and 41 to respective adders 33 and 39 to provide vertical enhancement to the "real" and interpolated signals, respectively. As noted above, of course, adders 33 and 39 may both be included or only adder 33 or adder 39 may be included—the choice depends on the subjective effect desired. Furthermore, amplifiers 35 and 41 are provided having polarity and gain dependent upon the subjective effect to be provided. The interpolated output from adder 39 is applied to terminal 37 of speed-up processor 33 and the output from adder 33 is applied to another input of speed-up processor 23. Speed-up processor 23 provides twice-rate luminance information which alternates between "real" and interpolated lines which is applied to matrix 43. The R, G and B outputs of matrix 43 are converted to analog form and D-to-A's 45, 47 and 49 forming analog R, G and B signals which are applied to kinescope 51 for display in a progressive scan format.

It should be noted that the sequence of the interpolated and "real" lines may be important. If the sequence of the incoming lines is A, B, C and D then the sequence of the "real" and interpolated lines should be as follows A, A+B, B, B+C, C, C+D, D. The system described in FIGS. 1–5 provides such a sequence.

In summary a system has been described which provides line interpolated progressive scan signals with improve vertical sharpness. This is accomplished using a minimum of line memory elements. In fact it has been developed using elements of a two terminal transversal filter having a one horizontal line delay to form separated luminance and chrominance components as well as the interpolated luminance information.

Other embodiments of this invention which are not described in the detailed description fall within the scope of the claims appended hereto. In particular, the chrominance channel has been described herein as only doubled-in-speed with no interpolation. It should be apparent, however, that interpolation in the chrominance channel falls within the spirit of the present invention. Further, the arrangement for demodulating and speeding up the chrominance information has been described where the demodulation process of the chrominance to its I and Q components is done prior to the speed-up process. The speed-up process as described in the aforementioned Pritchard application. Furthermore, in the luminance channel the system has been described wherein the luminance is separated from the chrominance channel prior to the two-times speed-up. It should be noted that the two-times speed-up process could be performed in conjunction with or prior to the separation process. Also the invention has been described using a two terminal transversal filter having 1H delay for separating the compostie signal into its luminance and chrominance components and using the transversal filter for the interpolator. It should be apparent to one of skill in the art that vertical detail information may be obtained by providing the difference between two successive horizontal lines.

What is claimed is:

1. In a color television system for producing a progressively scanned image, an apparatus comprising:
   a source of television signals representing luminance and chrominance information of an image raster-scanned in an interlaced fashion;
   luminance time-compression means coupled to said source of television signals for dividing the duration of each line of the luminance-representative signal by a first predetermined factor forming a speeded-up luminance-representative signal;
   chrominance time-compression means coupled to said source of television signals for reducing the time duration of each line of the chrominance-representative signal by a second predetermined factor forming a speeded-up chrominance-representative signal;
   interpolating means coupled to receive said television signals for generating lines of signals representative of an estimate of signals which would represent the image between time-successive lines of the signals of said source of television signals, and for separating said television signals into said luminance-representative and said chrominance-representative signals, and
   display means coupled to said luminance and chrominance time-compression means and to said interpolating means for displaying, by progressive scanning, lines of video derived from said chrominance time-compression means and from said luminance time-compression means;
   whereby when said interpolating means generates an estimate of a signal from two samples of time-successive lines of said signals said progressively scanned image suffers a loss of vertical detail on signal transitions that occur on adjacent lines of said television signals;
   said apparatus further comprising:
   detail means for recovering spectral components representative of the vertical detail in said luminance information from a signal including vertical detail information and for combining said spectral components with said luminance-representative signal to improve vertical detail on said signal transitions.

2. The system according to claim 1 wherein said spectral components are combined having a predetermined polarity and a predetermined gain.

3. The system according to claim 2 wherein said detail means includes a low pass filter for low pass filtering said separated chrominance-representative signal to recover said vertical detail.

4. The system according to claim 3 wherein said detail means includes an adder for combining said spectral components with said luminance-representative signal.

5. A color television system for producing a progressively scanned image, comprising:
   a source of television signals representing luminance information and chrominance information of an image raster-scanned at a first rate in an interlaced fashion;
   first separating means, coupled for receiving said television signals, for separating said television signals into first and second signal components, said first signal component being representative of said luminance information absent low frequency vertical detail information and said second signal component being representative of said chrominance information;
   second separating means coupled for receiving said second signal component for separating said second signal component into spectral components including low frequency vertical detail information derived from said first separating means;
   combining means coupled to receive said recovered low frequency vertical detail information and said first signal component for inserting said absent low frequency vertical detail information into said first signal component; and
   time-compression means coupled for receiving said first and second signal components for increasing said first rate of said television signal for displaying, by progressive scanning, non-interlaced luminance and chrominance information on a raster.

6. The system according to claim 5 wherein said vertical detail information is combined having a predetermined polarity and a predeterined gain.

7. The system according to claim 5 wherein said vertical detail information is combined having a predetermined non-linear transfer characteristic.

8. The system according to claim 6 wherein said second separating means includes a low pass filter for low pass filtering said second signal component.

9. The system according to claim 8 wherein said second separating means includes an adder for combining said low frequency vertical detail information with said first signal component.

10. A color television system for producing a progressively scanned image, comprising:
- a source of television signals representing luminance information and chrominance information of an image raster-scanned at a first rate in an interlaced fashion;
- first separating means coupled for receiving said television signals for separating said television signals into first and second signal components, said first signal component representing a first portion of said luminance information having a frequency spectrum with signal energy concentrated in the vicinity of integer multiples of said first rate and nulls of signal energy in the vicinity of odd integer multiples of one-half of said first rate and said second signal component representing a second portion of said luminance information and said chrominance information having a frequency spectrum with signal energy concentrated in the vicinity of odd integer multiples of one-half of said first rate and nulls of signal energy in the vicinity of integer multiples of said first rate;
- second separating means coupled for receiving said second signal component for recovering spectral components of said second signal component including said second portion of said luminance information;
- combining means coupled for receiving said recovered spectral components of said second signal component and said first signal component for inserting vertical detail information by combining said second portion of said luminance information with said first portion of said luminance information; and
- time-compression means coupled for receiving said first and second signal components for increasing said first rate of television signals for displaying progressively scanned, non-interlaced luminance and chrominance information on a raster.

11. The system according to claim 10 wherein said first separating means provides an estimate of signals which would represent the image between time-successive lines of the signals of said source of television signals.

12. The system according to claim 11 wherein said estimate is formed from two samples of said signals.

13. The system according to claim 11 wherein said second separating means includes a low pass filter for low pass filtering said second signal component to recover said vertical detail information.

14. The system according to claim 13 wherein said second separating means includes an adder for combining said low pass filtered second signal component with said first signal component.

15. The system according to claim 13 wherein said spectral components are combined having a predetermined polarity and a predetermined gain.

16. A color television system for producing a progressively scanned image, comprising:
- a source of television signals representing luminance and chrominance information of an image raster-scanned at a first rate in an interlaced fashion;
- two terminal transversal filter means having a one-line delay coupled to receive said television signals for separating said television signals into first and second components, and for generating lines of said first component signals representative of an estimate of signals which would represent the image between time-successive lines of the signals of said source of television signals;
- separating means coupled to receive signals including vertical detail information for recovering spectral components of the vertical detail in said luminance information from said signals including vertical detail and for combining said spectral components with said first component signal;
- time-compression means, coupled for receiving said television signals, for increasing said first rate of said television signals for displaying progressively scanned, non-interlaced luminance and chrominance information on a raster.

17. The system according to claim 16 wherein said estimate is formed from two samples of said signals.

18. A color television system for producing a progressively scanned image, comprising:
- a source of television signals representing luminance and chrominance information of an image raster-scanned at a first rate in an interlaced fashion;
- separating means coupled to receive said television signals, for separating said television signals into first and second signal components;
- first signal path, coupled to receive said first signal component, for generating said luminance information at twice said first rate;
- second signal path, coupled to receive said second signal component, for generating said chrominance information at twice said first rate;
- detail means, coupled to receive signals including vertical detail information in said television signals, for recovering spectral components of the vertical detail in such luminance information;
- combining means, coupled in said first signal path, for combining said spectral components of said vertical detail with at least a portion of said luminance information to form an improved luminance signal;
- display means, coupled to receive signals from said first and second signal paths, for displaying lines of video from said first and second path by progressive scanning.

19. The system according to claim 18 wherein said first signal path includes a third signal path for generating signals representative of an estimate of signals which would represent the image between time-successive lines of the signals of said source of television signals and a fourth signal path for generating at least a portion of unmodified signals representative of said image.

20. The system according to claim 19 wherein said signals including vertical detail information comprise low pass filtered second signal component.

21. The system according to claim 20 wherein said separating means comprises a two terminal transversal filter having a one-line delay for effecting said separating and for generating lines of said first signal component representative of an estimate of signals which would represent the image between time-successive lines of the signals of said source of television signals.

22. The system according to claim 21 wherein said combining means combines said signals in said third signal path with said spectral components of said vertical detail.

23. The system according to claim 21 wherein said combining means combines said signals in said fourth signal path with said spectral components of said vertical detail.

24. The system according to claim 19 wherein said signals including vertical detail information are derived by combining the signals in said third signal path with the signals in said fouth signal path.

25. The system according to claim 24 wherein said combining is formed by taking the difference between said signals in said third and fourth signal paths.

26. The system according to claim 25 further comprising time-compression means for generating said spectral components of said vertical detail at a predetermined amount of said first rate and wherein said combining means combines said twice rate spectral components with said twice rate luminance information.

27. The system according to claim 26 wherein said predetermined amount is twice.

28. The system according to claim 27 wherein said separating means comprises a two terminal transversal filter having a one-line delay for effecting said separating and for generating lines of said first component signals representative of an estimate of signals which would represent the image between time-successive lines of the signals of said source of television signals.

29. The system according to claim 28 wherein said estimate is formed from two samples of said signals.

30. A color television system for producing a progressively scanned image, comprising:
   a source of television signals representing luminance and chrominance information of an image raster-scanned at a first rate in an interlaced fashion;
   first separating means, coupled to receive said television signals, for separating said television signals into first and second signal components;
   first signal path coupled to receive said first signal component, for generating said luminance information at twice said first rate;
   second signal path, coupled to receive said second signal component, for generating said chrominance information at twice said first rate;
   detail means, coupled to receive said second signal component, for recovering spectral components of the vertical detail of said luminance information;
   first combining means for combining said vertical detail with said first signal component;
   second separating means, coupled to receive said second signal component, for recovering high frequency information in said second signal component representative of said chrominance information;
   second combining means for removing said high frequency information representative of chrominance information in said second signal component from said television signals in said first signal path to provide said luminance information in said first signal path; and
   display means, coupled to receive signals from said first and second signal paths, for displaying lines of video from said first and second paths by progressive scanning.

31. The system according to claim 30 wherein said first separating means comprises a two terminal transversal filter having a one-line delay for effecting said separating and for generating lines of said first component signals representative of an estimate of signals which would represent the image between time-successive lines of the signals of said source of television signals.

32. A color television system for producing a progressively scanned image, comprising:
   a source of television signals representing luminance and chrominance information of an image raster-scanned at a first rate in an interlaced fashion;
   first separating means, coupled to receive said television signals, for separating said television signals into first and second signal components;
   first signal path coupled to receive said first signal component, for generating said luminance information at twice said first rate;
   second signal path, coupled to receive said second signal component, for recovering spectral components of the vertical detail of said luminance information and for generating said chrominance information at twice said first rate;
   combining means, coupled in said first signal path, for combining said spectral components of said vertical detail with said first signal component to provide improved luminance information; and
   third separating means, coupled to receive said second signal component and provided in said second signal path, for providing said chrominance information in said second signal path; and
   display means, coupled to receive signals from said first and second signal paths, for displaying lines of video from said first and second paths by progressive scanning.

33. The system according to claim 32 wherein said first separating means comprises a two terminal transversal filter having a one-line delay for effecting said separating and for generating lines of said first component signals representative of an estimate of signals which would represent the image between time-successive lines of the signals of said source of television signals.

34. The system according to claim 33 wherein said spectral components are combined having a predetermined gain and a predetermined polarity.

35. In a color television system for producing a progressively scanned image, a method for effecting progressive scan comprising:
   supplying a television signal representing luminance information and chrominance information of an image raster-scanned at a first rate in an interlaced fashion;
   separating said television signal into first and second signal components, said first signal component being representative of said luminance information absent low frequency vertical detail information and said second signal component being representative of said chrominance information;
   separating said second signal component into spectral components to recover low frequency vertical detail information from said separated chrominance information;
   combining said recovered low frequency vertical detail information with said first signal component to insert said absent low frequency vertical detail information to said first signal component; and
   increasing said first rate of said television signal for displaying progressively scanned, non-interlaced luminance and chrominance information on a raster.

36. In a color television system for producing a progressively scanned image, a method for effecting progressive scan comprising:
   supplying a television signal representing luminance and chrominance information of an image raster-scanned at a first rate in an interlaced fashion;

separating said television signal into first and second signal components, said first signal component representing a first portion of said luminance information having a frequency spectrum with signal energy concentrated in the vicinity of integer multiples of said first rate and nulls of signal energy in the vicinity of odd integer multiples of one-half of said first rate and said second signal component representating a second portion of said luminance information and said chrominance information having a frequency spectrum in the vicinity of odd integer multiples of one-half of said first rate and nulls of signal energy in the vicinity of integer multiples of said first rate;

separating said second signal component to recover spectral components thereof including said second portion of said luminance information;

combining said recovered spectral components of said second signal component with said first signal component restoring vertical detail information by combining said second portion of said luminance information with said first portion of said luminance information; and increasing said first rate of said television signal for displaying progressively scanned, non-interlaced luminance and chrominance information on a raster.

37. A color television system for producing a progressively scanned image, comprising:

a source of television signals representing luminance and chrominance information of an interlaced image;

luminance time-compression means coupled to said source of television signals for dividing the duration of each line of the luminance-representative signal by a first predetermined factor forming a speeded-up luminance-representative signal;

chrominance time-compression means coupled to said source of television signals for reducing the time duration of each line of the chrominance-representative signal by a second predetermined factor forming a speeded-up chrominance-representative signal;

interpolating means coupled to receive said television signals for generating lines of signals representative of an estimate of signals which would represent the image between time-successive lines of the signals of said source of television signals, and for separating said television signals into said luminance-representative and said chrominance-representative signals, and display means coupled to said luminance and chrominance time-compression means and to said interpolating means for displaying, by progressive scanning, lines of video derived from said chrominance time-compression means and from said luminance time-compression means;

whereby when said interpolating means generates as estimate of a signal from two samples of time-successive lines of said signals said progessively scanned image suffers a loss of vertical detail on signal transitions that occur on adjacent lines of said television signals;

the improvement, comprising:

detail means for recovering spectral components representative of the vertical detail in said luminance information from a signal including vertical detail information and for combining said spectral components with said luminance-representative signal to improve vertical detail on said signal transition.

* * * * *

UNITED STATES PATENT AND TRADEMARK OFFICE
CERTIFICATE OF CORRECTION

PATENT NO. : 4,558,347
DATED     : December 10, 1985
INVENTOR(S) : Dalton H. Pritchard et al.

It is certified that error appears in the above-identified patent and that said Letters Patent is hereby corrected as shown below:

Column 7, line 65: "filter 402" should be--filter 401--.

Column 9, lines 22-23: "The speed-up process as described in the aforementioned Pritchard application." should be --The speed-up process may be performed prior to the demodulation process as described in the aforementioned Pritchard application.--

Column 12, line 34, Claim 18: "in such luminance" should be --in said luminance--.

Signed and Sealed this

Twenty-fourth Day of June 1986

[SEAL]

Attest:

DONALD J. QUIGG

Attesting Officer

Commissioner of Patents and Trademarks